UNITED STATES PATENT OFFICE.

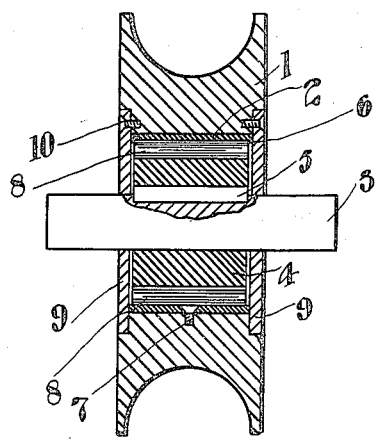
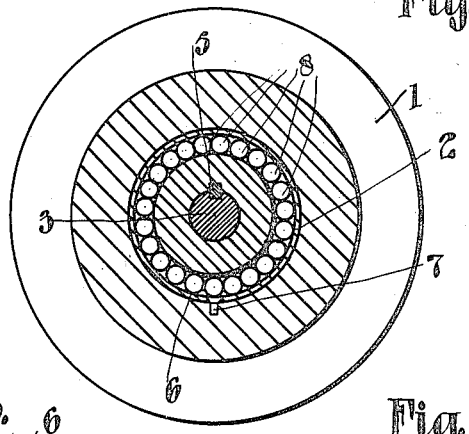
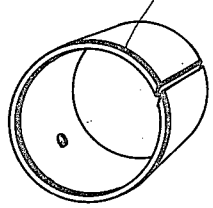
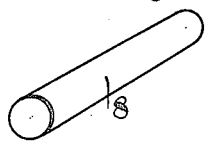

HENRY CARL ADAM, OF HAMILTON, AND JACOB CHRISTOPHER ADAM, OF TRENTON, ONTARIO, CANADA.

TROLLEY-WHEEL.

1,174,952. Specification of Letters Patent. Patented Mar. 14, 1916.

Application filed July 13, 1914. Serial No. 850,667.

*To all whom it may concern:*

Be it known that we, HENRY CARL ADAM, of the city of Hamilton, in the county of Wentworth, in the Province of Ontario, Canada, and JACOB CHRISTOPHER ADAM, of the town of Trenton, in the county of Hastings, in the Province of Ontario, Canada, have invented certain new and useful Improvements in Trolley-Wheels, of which the following is the specification.

Our invention relates to improvements in trolley wheels and the object of the invention is to devise a trolley wheel which will run more easily than those at present in use; a further object is to construct a wheel of the fewest possible parts in order that the cost of production can be materially decreased; a still further object is to construct a wheel which can be readily repaired, being capable of being taken apart with the minimum of labor.

Our invention consists of the parts constructed and arranged as hereinafter more particularly described and illustrated in the accompanying drawings in which:—

Figure 1 represents a cross sectional view of a trolley wheel constructed according to our invention. Fig. 2 is a vertical section taken at right angles to Fig. 1. Fig. 3 is a perspective detail of the liner, and Fig. 4 is a perspective detail of one of the rollers.

Like characters of reference indicate corresponding parts in the different views.

1 is a suitably grooved trolley wheel portion provided with a hollow central portion 2.

3 is the trolley wheel axle, said axle being adapted to be rigidly secured to the harp of the trolley pole.

4 is a sleeve on the axle 3 suitably keyed thereto by the key 5.

6 is a split liner adapted to be inserted within the central hollow portion and to be secured to the wall thereof by the screw 7.

8, 8 are rollers inserted between the liner 6 and the sleeve 4, said rollers being independent of each other and being merely inserted into the space between the sleeve and the liner.

9, 9 are plates adapted to close the interior 2 of the trolley wheel portion and to confine the sleeve and rollers within the same, said plates being secured to the trolley wheel portion 1 by the screws 10.

Vaseline or other suitable lubricant is adapted to be inserted into the interior 2 and thus lubricate the rollers 8.

From the above description it will be seen that a wheel constructed according to our invention will be exceedingly cheap to construct as it has very few parts, and further it will be a very free running wheel. The parts can also be readily renewed at a small expense. It will be seen that the split liner 6 serves as a roller race for the rollers 8. This is essential as the trolley wheel portion is preferably constructed of bronze, brass or the like and would not be suitable for the rollers to bear upon.

What we claim as our invention and desire to secure by Letters Patent is:—

In a trolley wheel, the combination with a trolley wheel body having a central orifice and the sleeve secured on the axle and the loose rollers extending around the sleeve of a split liner located between the rollers and the trolley wheel body and provided with a pin extending into the trolley wheel body and a split diametrically opposite the pin with the side edges of the split extending parallel to each other and diagonally through one side of the ring.

In testimony whereof, I have signed at the city of Hamilton, in the county of Wentworth, in the Province of Ontario, Canada, this 29 day of June, 1914.

HENRY CARL ADAM.

Witnesses:
E. M. NEAME,
J. E. M. FETHERSTONHAUGH.

In testimony whereof, I have signed at the town of Trenton, in the county of Hastings, in the Province of Ontario, Canada, this 29 day of June, 1914.

JACOB CHRISTOPHER ADAM.

Witnesses:
W. H. SULAND,
CHAS. M. FOSTER.